United States Patent
Xu et al.

(10) Patent No.: US 10,892,884 B2
(45) Date of Patent: Jan. 12, 2021

(54) METHOD FOR UPDATING CLOCK SYNCHRONIZATION TOPOLOGY, METHOD FOR DETERMINING CLOCK SYNCHRONIZATION PATH, AND DEVICE

(71) Applicant: Huawei Technologies Co., Ltd., Shenzhen (CN)

(72) Inventors: Jinchun Xu, Shenzhen (CN); Yuanlong Jiang, Shenzhen (CN); Hengjun Zhu, Shenzhen (CN); Xian Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 16/134,637

(22) Filed: Sep. 18, 2018

(65) Prior Publication Data
US 2019/0020463 A1    Jan. 17, 2019

Related U.S. Application Data

(63) Continuation of application No. PCT/CN2017/075252, filed on Feb. 28, 2017.

(30) Foreign Application Priority Data

Mar. 18, 2016   (CN) .......................... 2016 1 0161046

(51) Int. Cl.
*H04L 7/00*        (2006.01)
*H04L 12/715*   (2013.01)
(Continued)

(52) U.S. Cl.
CPC .......... *H04L 7/0008* (2013.01); *H04J 3/0635* (2013.01); *H04J 3/0679* (2013.01);
(Continued)

(58) Field of Classification Search
CPC ..... H04J 3/0635; H04J 3/0679; H04L 7/0008; H04L 27/2655; H04L 41/12; H04L 45/02; H04L 45/04; H04L 45/42; H04L 45/64
See application file for complete search history.

(56) References Cited

U.S. PATENT DOCUMENTS 5,416,808 A * 5/1995 Witsaman ................ G04G 7/02
                                                        375/356
6,023,769 A * 2/2000 Gonzalez .................. G06F 1/14
                                                        713/400
(Continued)

FOREIGN PATENT DOCUMENTS

CN        101136738 A        3/2008
CN        101820355 A        9/2010
(Continued)

OTHER PUBLICATIONS

Machine Translation and Abstract of Japanese Publication No. JP2015177275, Oct. 5, 2015, 27 pages.
(Continued)

*Primary Examiner* — Eric Nowlin
(74) *Attorney, Agent, or Firm* — Conley Rose, P.C.

(57) ABSTRACT

A method for determining a clock synchronization path, and a device, where the method includes determining a first clock synchronization path from a clock injection node of the first network to the first network element based on a request of the first network element and the clock synchronization topology of the first network. A clock synchronization topology is automatically updated based on clock synchronization capability information of a network element, and a clock synchronization path is determined to reduce costs of deploying a clock synchronization path.

18 Claims, 8 Drawing Sheets

(51) Int. Cl.
*H04J 3/06* (2006.01)
*H04L 12/717* (2013.01)
*H04L 12/751* (2013.01)

(52) U.S. Cl.
CPC .............. *H04L 45/02* (2013.01); *H04L 45/04* (2013.01); *H04L 45/42* (2013.01); *H04L 45/64* (2013.01)

(56) References Cited

U.S. PATENT DOCUMENTS

| | | | | |
|---|---|---|---|---|
| 6,418,151 | B1* | 7/2002 | Walter | H04J 3/0638 370/503 |
| 6,629,249 | B2* | 9/2003 | Gonzalez | G06F 1/14 713/400 |
| 6,665,316 | B1* | 12/2003 | Eidson | G06F 1/14 370/509 |
| 6,711,411 | B1* | 3/2004 | Ruffini | H04J 3/0641 370/350 |
| 6,975,653 | B2* | 12/2005 | Eidson | H04J 3/0664 370/503 |
| 7,613,212 | B1* | 11/2009 | Raz | H04J 3/0641 370/510 |
| 7,616,682 | B2* | 11/2009 | Small | G01S 1/24 375/220 |
| 9,467,958 | B2* | 10/2016 | Gorokhov | H04J 11/0069 |
| 9,654,242 | B2* | 5/2017 | Cao | H04J 3/0641 |
| 9,986,049 | B2* | 5/2018 | Zhao | H04L 67/18 |
| 2005/0001742 | A1* | 1/2005 | Small | G01S 5/021 340/988 |
| 2007/0064851 | A1* | 3/2007 | Hall, II | H04L 12/1813 375/356 |
| 2007/0177605 | A1* | 8/2007 | Benco | H04B 7/2693 370/395.4 |
| 2008/0144515 | A1* | 6/2008 | Ouellette | H04J 3/0679 370/242 |
| 2009/0276542 | A1* | 11/2009 | Aweya | H04J 3/0667 709/248 |
| 2010/0265943 | A1* | 10/2010 | Dong | H04L 45/04 370/389 |
| 2011/0305247 | A1 | 12/2011 | Lepallec et al. | |
| 2012/0287948 | A1 | 11/2012 | Ruffini et al. | |
| 2014/0181320 | A1* | 6/2014 | Farkas | H04L 45/00 709/238 |
| 2016/0149658 | A1* | 5/2016 | Xia | H04L 41/06 370/217 |
| 2016/0254996 | A1* | 9/2016 | Zhao | H04L 67/18 370/241 |
| 2017/0078038 | A1 | 3/2017 | Tashiro et al. | |
| 2017/0222743 | A1 | 8/2017 | Ruffini et al. | |
| 2017/0331574 | A1 | 11/2017 | Tang et al. | |
| 2018/0123773 | A1* | 5/2018 | Cui | A61B 6/582 |
| 2018/0131459 | A1 | 5/2018 | Zhang et al. | |

FOREIGN PATENT DOCUMENTS

| | | | |
|---|---|---|---|
| CN | 102082652 A | 6/2011 | |
| CN | 102468898 A | 5/2012 | |
| CN | 102714559 A | 10/2012 | |
| CN | 104092528 A | 10/2014 | |
| CN | 105634714 A * | 6/2016 | ............ H04J 3/0638 |
| EP | 1811713 A1 | 7/2007 | |
| EP | 2093925 A1 | 8/2009 | |
| EP | 2367309 A1 * | 9/2011 | ................ H04J 3/14 |
| EP | 2624007 A1 * | 8/2013 | ............ G01S 5/0289 |
| EP | 3145111 A1 | 3/2017 | |
| EP | 3214795 A1 | 9/2017 | |
| EP | 3382918 A1 * | 10/2018 | ............ H04J 3/0673 |
| EP | 3419230 A1 * | 12/2018 | ............ H04L 45/04 |
| JP | H0457423 A | 2/1992 | |
| JP | 2012520591 A | 9/2012 | |
| JP | 2015177275 A | 10/2015 | |
| KR | 20120084328 A | 7/2012 | |
| WO | WO-2008112194 A1 * | 9/2008 | ............ H04J 3/0652 |
| WO | WO-2011098466 A1 * | 8/2011 | ................ H04J 3/14 |
| WO | 2015136799 A1 | 9/2015 | |
| WO | 2015172476 A1 | 11/2015 | |
| WO | WO-2017157170 A1 * | 9/2017 | ............ H04L 7/0008 |

OTHER PUBLICATIONS

Machine Translation and Abstract of Japanese Publication No. JPH0457423, Part 1, Feb. 25, 1992, 8 pages.
Machine Translation and Abstract of Japanese Publication No. JPH0457423, Part 2, Feb. 25, 1992, 3 pages.
Foreign Communication From a Counterpart Application, Japanese Application No. 2018-549156, Japanese Office Action dated Oct. 7, 2019, 4 pages.
Foreign Communication From a Counterpart Application, Japanese Application No. 2018-549156, English Translation of Japanese Office Action dated Oct. 7, 2019, 5 pages.
Machine Translation and Abstract of Chinese Publication No. CN101136738, Mar. 5, 2008, 14 pages.
Machine Translation and Abstract of Chinese Publication No. CN101820355, Sep. 1, 2010, 19 pages.
Machine Translation and Abstract of Chinese Publication No. CN102082652, Jun. 1, 2011, 13 pages.
Machine Translation and Abstract of Chinese Publication No. CN102468898, May 23, 2012, 16 pages.
Machine Translation and Abstract of Chinese Publication No. CN104092528, Oct. 8, 2014, 22 pages.
"IEEE Instrumentation and Measurement Society," IEEE Std 1588, Jul. 24, 2008, 324 pages.
Foreign Communication From a Counterpart Application, PCT Application No. PCT/CN2017/075252, English Translation of International Search Report dated Jun. 2, 2017, 2 pages.
Foreign Communication From a Counterpart Application, PCT Application No. PCT/CN2017/075252, English Translation of Written Opinion dated Jun. 2, 2017, 7 pages.
Pallec, M., et al., "Time and Frequency Distribution Over Packet Switched Networks," Alcatel Lucent, Bell Labs Technical Journal, vol. 14, No. 2, pp. 131-153.
Foreign Communication From a Counterpart Application, European Application No. 17765712.9, Partial Supplementary European Search Report dated Jan. 21, 2019, 18 pages.
Foreign Communication From a Counterpart Application, European Application No. 17765712.9, Extended European Search Report dated Apr. 2, 2019, 21 pages.

* cited by examiner

METHOD FOR UPDATING CLOCK SYNCHRONIZATION TOPOLOGY, METHOD FOR DETERMINING CLOCK SYNCHRONIZATION PATH, AND DEVICE

CROSS-REFERENCE TO RELATED APPLICATIONS

This application is a continuation of International Patent Application No. PCT/CN2017/075252 filed on Feb. 28, 2017, which claims priority to Chinese Patent Application No. 201610161046.0 filed on Mar. 18, 2016. The disclosures of the aforementioned applications are hereby incorporated by reference in their entireties.

TECHNICAL FIELD

The present disclosure relates to the communications field, and in particular, to a method for updating a clock synchronization topology, a method for determining a clock synchronization path, and a device.

BACKGROUND

In a network, network devices that communicate with each other need to have synchronous clocks. That two network devices have synchronous clocks may be as follows.

(1) The two network devices have clocks with a same frequency, where a phase difference between clock signals is a constant value.

(2) The two network devices have clocks with a same phase, where a phase difference between clock signals is constantly zero.

In a mobile bearer network, it is particularly important for different base stations to have synchronous clocks.

Generally, a method for obtaining synchronous clocks by different network devices is as follows. Different network devices directly or indirectly obtain clock signals from a same clock source, and generate local system clocks of the network devices based on the clock signals. For example, a first-hop network device connected to the clock source directly obtains a clock signal from the clock source, and generates a local system clock of the network device. The network device sends a clock signal to a next-hop network device of the network device, and the next-hop network device receives the clock signal, and generates a local system clock of the next-hop network device. That is the next-hop network device indirectly obtains the clock signal from the clock source.

A clock signal transmission path from the clock source to a network device that directly or indirectly obtains a clock signal from the clock source is a clock synchronization path from the clock source to the network device.

In other approaches, the clock synchronization path is usually planned and deployed by a network manager. Deployment of the clock synchronization path becomes very complex when the network is large in scale. As a result, deployment efficiency is low, and the deployment is prone to error. When a primary clock synchronization path and a secondary clock synchronization path that are deployed for a network device in advance are both faulty, the network manager usually cannot redeploy a clock synchronization path in a timely manner. Consequently, precision of a clock of a downstream clock synchronization path node of a faulty node is degraded, thereby affecting service transmission.

SUMMARY

This application provides a method for updating a clock synchronization topology and a method for determining a clock synchronization path to improve efficiency of deploying a clock synchronization path.

According to a first aspect, a method for updating a clock synchronization topology is provided, and the method includes receiving a first packet from a first network element, where the first packet includes clock synchronization capability information of the first network element, the first network element is a network element in a first network, and the first network element has a clock synchronization capability, and updating a clock synchronization topology of the first network based on the clock synchronization capability information of the first network element.

The clock synchronization topology of the first network is updated based on the clock synchronization capability information of the first network element to automatically obtain information for computing a clock synchronization path, thereby providing sufficient information for correctly computing a clock synchronization path. In this way, costs of deploying a clock synchronization path are reduced.

Optionally, an updated clock synchronization topology of the first network includes a clock injection node of the first network, and the method further includes determining a clock synchronization path from the clock injection node to the first network element based on the updated clock synchronization topology of the first network. The clock synchronization path can be automatically and accurately computed for the first network element using the updated clock synchronization topology to improve efficiency of deploying a synchronization path.

According to a second aspect, a path computation device is provided, including a receiving unit and an updating unit.

The receiving unit is configured to receive a first packet from a first network element. The first packet includes clock synchronization capability information of the first network element, the first network element is a network element in a first network, and the first network element has a clock synchronization capability.

The updating unit is configured to update a clock synchronization topology of the first network based on the clock synchronization capability information of the first network element from the receiving unit.

Optionally, the device further includes a determining unit, an updated clock synchronization topology of the first network includes a clock injection node of the first network, and the determining unit is configured to determine a clock synchronization path from the clock injection node to the first network element based on the updated clock synchronization topology.

According to a third aspect, a path computation device is provided, including a network interface, a memory, and a processor. The memory is configured to store a clock synchronization topology of a first network. The processor is configured to perform the following operations of receiving a first packet from a first network element using the network interface, where the first packet includes clock synchronization capability information of the first network element, the first network element is a network element in the first network, and the first network element has a clock synchronization capability, and updating the clock synchronization topology of the first network based on the clock synchronization topology of the first network in the memory and the clock synchronization capability information of the first network element.

Optionally, an updated clock synchronization topology of the first network includes a clock injection node of the first network, and the processor is further configured to determine a clock synchronization path from the clock injection node to the first network element based on the updated clock synchronization topology.

Optionally, in any one of the first aspect, the second aspect, and the third aspect, the clock synchronization capability information of the first network element includes information about at least one port that has the clock synchronization capability in the first network element.

According to a fourth aspect, a method for determining a clock synchronization path is provided, including receiving a first packet from a first network element, where the first packet is used to request to determine a clock synchronization path for the first network element, the first network element is a network element in a first network, and the first network element has a clock synchronization capability, and determining a first clock synchronization path from a clock injection node of the first network to the first network element based on a clock synchronization topology of the first network, where the clock synchronization topology of the first network includes the clock injection node and the first network element.

The clock synchronization path is automatically determined for the first network element using the clock synchronization topology of the first network when the first network element requests to determine the clock synchronization path. In this way, costs and complexity of deploying a synchronization path are reduced.

According to a fifth aspect, a path computation device is provided, including a receiving unit and a determining unit.

The receiving unit is configured to receive a first packet from a first network element. The first packet is used to request to determine a clock synchronization path for the first network element, the first network element is a network element in a first network, and the first network element has a clock synchronization capability.

The determining unit is configured to determine a first clock synchronization path from a clock injection node of the first network to the first network element based on a clock synchronization topology of the first network. The clock synchronization topology of the first network includes the clock injection node and the first network element.

According to a sixth aspect, a path computation device is provided, including a network interface, a memory, and a processor. The processor is configured to read a program in the memory to perform the following operations of receiving a first packet from a first network element using the network interface, where the first packet is used to request to determine a clock synchronization path for the first network element, the first network element is a network element in a first network, and the first network element has a clock synchronization capability, and determining a first clock synchronization path from a clock injection node of the first network to the first network element based on a clock synchronization topology of the first network, where the clock synchronization topology of the first network includes the clock injection node and the first network element.

Optionally, in any one of the fourth aspect, the fifth aspect, and the sixth aspect, the first packet is further used to indicate that a second clock synchronization path from the clock injection node to the first network element is faulty, and the second clock synchronization path includes at least one network element that is not on the first clock synchronization path.

The first clock synchronization path can be automatically determined for the first network using information that indicates that the second clock synchronization path is faulty and that is carried in the first packet. The first clock synchronization path does not include a faulty network element or port. In this way, a new synchronization path is fast obtained for the first network element after the clock synchronization path is faulty to reduce impact of clock signal degradation on service transmission.

According to a seventh aspect, a method for updating an inter-network clock synchronization topology is provided, including receiving a first packet from a path computation device in a first network, where the first packet includes clock synchronization capability information of a first network element in the first network, and updating an inter-network clock synchronization topology based on the clock synchronization capability information of the first network element.

The inter-network clock synchronization topology is updated by receiving the clock synchronization capability information of the first network element to automatically obtain information for computing an inter-network clock synchronization path, thereby providing sufficient information for correctly computing the inter-network clock synchronization path. In this way, costs and complexity of deploying an inter-network clock synchronization path are reduced.

Optionally, an updated inter-network clock synchronization topology further includes a clock injection node of a second network and a second edge network device that has a clock synchronization capability in the first network, and the method further includes determining a clock injection node of the first network based on the updated inter-network clock synchronization topology. The clock injection node is automatically determined for the first network using the inter-network clock synchronization topology. In this way, costs and complexity of deploying a clock synchronization path are reduced.

According to an eighth aspect, an inter-network path computation device is provided, including a receiving unit and an updating unit.

The receiving unit is configured to receive a first packet from a path computation device in a first network. The first packet includes clock synchronization capability information of a first network element in the first network.

The updating unit is configured to update an inter-network clock synchronization topology based on the clock synchronization capability information of the first network element from the receiving unit, and send an updated inter-network clock synchronization topology to a storing unit.

Optionally, the updated inter-network clock synchronization topology further includes a clock injection node of a second network and a second edge network device that has a clock synchronization capability in the first network. The device further includes a determining unit, and the determining unit is configured to determine a clock injection node of the first network based on the updated inter-network clock synchronization topology.

According to a ninth aspect, an inter-network path computation device is provided, including a network interface, a memory, and a processor. The memory is configured to store an inter-network clock synchronization topology. The processor is configured to perform the following operations of receiving a first packet from a path computation device in a first network using the network interface, where the first packet includes clock synchronization capability information of a first network element in the first network, and updating the inter-network clock synchronization topology based on the inter-network clock synchronization topology in the memory and the clock synchronization capability information of the first network element.

Optionally, an updated inter-network clock synchronization topology further includes a clock injection node of a second network and a second edge network device that has a clock synchronization capability in the first network, and the processor is further configured to determine a clock injection node of the first network based on the updated inter-network clock synchronization topology.

Optionally, in any one of the seventh aspect, the eighth aspect, and the ninth aspect, the first network element is a first edge network device in the first network.

Optionally, in any one of the seventh aspect, the eighth aspect, and the ninth aspect, the clock synchronization capability information of the first network element includes information about at least one port that has the clock synchronization capability in the first network element.

According to a tenth aspect, a method for determining a clock synchronization path is provided, including receiving a first packet from a path computation device in a first network, where the first packet is used to request to determine a clock injection node of the first network, determining a first edge network device in the first network as a first clock injection node of the first network based on an inter-network clock synchronization topology, where the inter-network clock synchronization topology includes the first edge network device and a second clock injection node of a second network, and the second network is an upstream network of the first network, and determining a clock synchronization path from the second clock injection node to the first clock injection node.

The clock injection node and the clock synchronization path that is of the clock injection node and that is for obtaining a clock signal are automatically determined for the first network using the inter-network clock synchronization topology. In this way, costs and complexity of deploying a clock synchronization path are reduced.

According to an eleventh aspect, an inter-network path computation device is provided, including a receiving unit and a determining unit.

The receiving unit is configured to receive a first packet from a path computation device in a first network. The first packet is used to request to determine a clock injection node of the first network.

The determining unit is configured to determine a first edge network device in the first network as a first clock injection node of the first network based on an inter-network clock synchronization topology. The inter-network clock synchronization topology includes the first edge network device and a second clock injection node of a second network, and the second network is an upstream network of the first network.

The determining unit is further configured to determine a clock synchronization path from the second clock injection node to the first clock injection node.

According to a twelfth aspect, an inter-network path computation device is provided, including a network interface, a memory, and a processor. The processor is configured to read a program in the memory to perform the following operations of receiving a first packet from a path computation device in a first network using the network interface, where the first packet is used to request to determine a clock injection node of the first network, determining a first edge network device in the first network as a first clock injection node of the first network based on an inter-network clock synchronization topology, where the inter-network clock synchronization topology includes the first edge network device and a second clock injection node of a second network, and the second network is an upstream network of the first network, and determining a clock synchronization path from the second clock injection node to the first clock injection node.

Optionally, in the tenth aspect, the eleventh aspect, and the twelfth aspect, the first packet further includes an identifier of a third clock injection node of the first network, and the third clock injection node and the first clock injection node are different edge network devices. A clock injection node different from the third clock injection node can be automatically determined for the first network using the identifier of the third clock injection node carried in the first packet. In this way, a new clock injection node is fast obtained for the first network when the third clock injection node cannot meet a requirement of the first network for obtaining a clock signal, thereby reducing impact of clock signal degradation on service transmission.

Optionally, in any one of the first aspect to the twelfth aspect, the first packet is a Path Computation Element (PCE) communication Protocol (PCEP) packet. When information in the first packet is carried using the PCEP packet, devices in a network do not need to jointly develop and define a new communications protocol for information exchange. In this way, costs for implementing this solution are reduced.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure.

In this application, a "network element" may be a network device. For example, the "network element" may be a router, a switch, an optical transport network (OTN) device, a packet transport network (PTN) device, a wavelength division multiplexing (WDM) device, or a server. A "node" may be a network device. For example, the "node" may be a router, a switch, an OTN device, a PTN device, a WDM device, or a server.

In this application, a "connection" relationship between devices or nodes may be replaced with a "coupling" relationship or a "communication" relationship.

In this application, a clock signal sent by a first network device is received by a second network device through one or more network devices, and a path on which the clock signal is sent by the first network device to the second network device is referred to as a clock synchronization path from the first network device to the second network device.

In two adjacent network devices on the clock synchronization path, a network device that sends a clock signal is referred to as a previous-hop clock synchronization path node, and a network device that receives a clock signal is referred to as a next-hop clock synchronization path node.

In this application, a clock synchronization topology of a network includes a plurality of network devices that have a clock synchronization capability in the network, ports that have the clock synchronization capability and that are of the plurality of network devices with the clock synchronization capability, and a connection relationship between the plurality of network devices that have the clock synchronization capability and that are connected to each other using the ports that have the clock synchronization capability. A connection relationship between the ports may be a physical connection relationship or a logical connection relationship.

Figure 1:
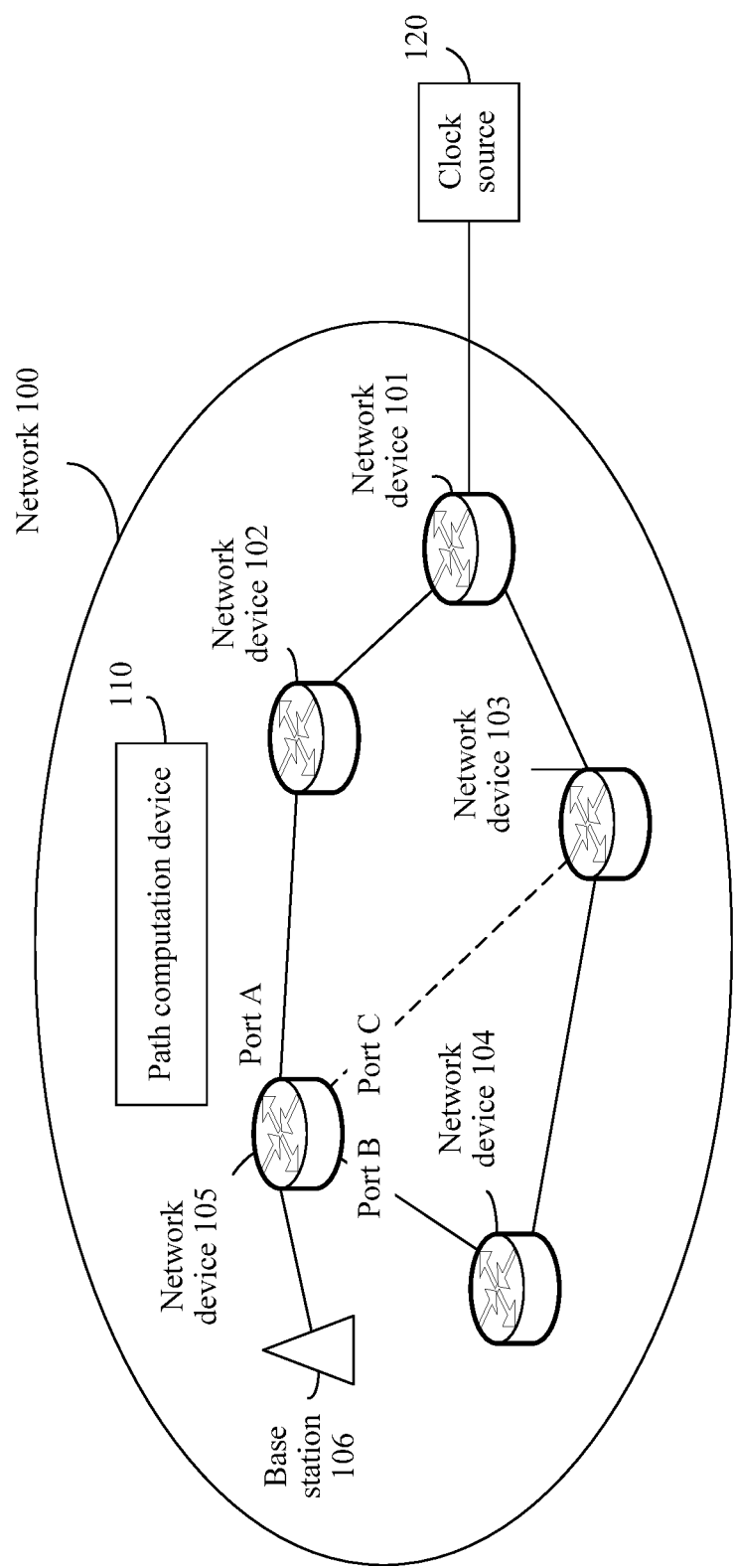
FIG. 1 is a schematic diagram of an application scenario according to an embodiment of this application.

FIG. 1 is a schematic diagram of a possible application scenario according to an embodiment of this application. A network 100 includes a network device 101, a network device 102, a network device 103, a network device 104, a network device 105, and a network device (designated as a base station) 106. The network device may be a router, a network switch, a firewall, a WDM device, a PTN device, a base station, a base station controller, a data center, or the like. The network 100 may be a carrier network, and may be particularly a mobile bearer network using wireless communication. The network 100 may be a network domain including some network devices in a carrier network. For example, the network 100 may be an autonomous system (AS) defined according to the Border Gateway Protocol (BGP). Alternatively, the network 100 may be a network domain obtained through division performed by a network manager based on a network topology structure. For example, the network 100 may be an access ring, an aggregation ring, or a core ring.

Some network devices in the network 100 need to obtain clock signals from a clock source to implement clock synchronization with the clock source. For example, the network device 106 is a base station, and clock synchronization needs to be performed between the clock source and base stations to implement clock synchronization between the base stations. In a process in which a user is handed over from a first base station to a second base station, if a clock of the first base station is not synchronized with that of the second base station, the user may encounter an anomaly such as call dropping or one-way audio. Therefore, base stations in the carrier network including the base station 106 need to obtain clock signals from a same clock source or a synchronous clock source to implement clock synchronization.

In the network 100, the base station 106 is connected to the network device 105. Therefore, the base station 106 needs to indirectly obtain a clock signal from the clock source using the network device 105, and at least one clock synchronization path needs to be deployed from the clock source to the network device 105. The clock synchronization path from the clock source to the network device 105 may include one or more intermediate network devices. Alternatively, the clock source may be directly connected to the network device 105. Certainly, the base station 106 may alternatively be directly connected to the clock source.

The network device 101 in the network 100 in FIG. 1 is connected to a clock source 120, and obtains a clock signal from the clock source 120. The clock source may also be referred to as a time source. For example, the clock source 120 may be a building integrated timing supply (BITS) device. The clock source 120 may be located within or outside the network 100. Certainly, there may be no network device connected to the clock source 120 in the network 100, and a network device in the network 100 obtains a clock signal from a network device in another network.

In this application, in a network, a first network device that obtains a clock signal from a clock source or a network device in another network is referred to as a clock injection node of the network. For example, it is assumed that the network device 101 is a network device in the network 100, and the network device 101 is a first network node that is in the network 100 and that obtains a clock signal from the clock source 120. Therefore, the network device 101 is referred to as a clock injection node of the network 100. Certainly, the network device 101 is used as a clock injection node, and may be directly connected to the clock source, or may be connected to an edge device in another network, and obtain a clock signal from the edge network device. For a specific example, refer to descriptions of FIG. 2.

A network device that is not directly connected to a clock source in a network may directly or indirectly obtain a clock signal from a clock injection node of the network. It should be noted that there may be one or more clock injection nodes of the network.

When there is a plurality of clock injection nodes of the network, the plurality of clock injection nodes may obtain clock signals from a same clock source or a synchronous clock source. The plurality of clock injection nodes include one primary clock injection node and one or more secondary clock injection nodes. When the primary clock injection node is faulty, the secondary clock injection node provides a clock signal for a network device in the network. Alternatively, the plurality of clock injection nodes may be synchronized with each other, and provide clock signals for a network device in the network. For a network device that needs to obtain a clock signal from a clock injection node, the network device may receive a clock signal from only one of the plurality of clock injection nodes, or may receive a plurality of clock signals from the plurality of clock injection nodes, and select a clock signal with a relatively high priority based on a priority preconfigured in the network device to generate a local system clock of the network device. For example, the clock signal with a relatively high priority may be a clock signal transmitted from a clock injection node to the network device through a relatively small quantity of hops.

For ease of description, the embodiments of this application mainly describe an example in which there is one clock injection node in a network. Persons skilled in the art may understand that the method in this application may also be applied to a case in which there is a plurality of clock injection nodes.

There may be one or more clock synchronization paths from the clock injection node of the network 100 to a network device (for example, the network device 105). When there are a plurality of clock synchronization paths, the plurality of clock synchronization paths may include one primary clock synchronization path and one or more secondary clock synchronization paths. When the primary clock synchronization path is faulty, a clock signal is sent to the network device 105 on the secondary clock synchronization path. Alternatively, clock signals may be simultaneously sent to the network device 105 on the plurality of clock synchronization paths, and the network device 105 selects a clock signal on one of the paths according to a preset policy in the device, to generate a local system clock of the network device 105. The preset policy may be selecting a clock signal with a relatively high priority based on a priority preconfigured in the network device to generate a local system clock of the network device. For example, the clock signal with a relatively high priority may be a clock signal transmitted from a clock injection node to the network device through a relatively small quantity of hops.

A path computation device 110 is configured to compute a clock synchronization path for each network device on which clock synchronization needs to be performed in the network 100. The path computation device 110 may be located within or outside the network 100. For example, the path computation device may be an independent physical device such as a server. Alternatively, the path computation device may be a function module of a network device in the network 100. The path computation device may be located within or outside the network. For example, the path computation device 110 communicates with a network device in the network 100 using a pre-established connection. The path computation device 110 is configured to receive clock synchronization capability information sent by the network device, receive a clock synchronization path computation request sent by the network device, or send, to the network device, information about a clock synchronization path computed for the network device. In an example, a connection is established between each network device in the network 100 and the path computation device 110 after each network device accesses the network 100. In another possible example, a connection is established between the path computation device 110 and only a network device that has a clock synchronization capability in the network 100.

For example, a connection is established between the path computation device 110 and each of the network devices 101, 102, 103, 104, and 105 in the network 100. The connection may be established according to the PCEP. For example, the path computation device 110 may be a PCE in a PCEP model. Each of the network devices 101, 102, 103, 104, and 105 may be a path computation client (PCC) in the PCEP model. For network architectures of the PCE and the PCC, refer to the Request For Comments (RFC) 4655 of the Internet Engineering Task Force.

For example, a synchronous Ethernet technology may be used in a method for obtaining a clock signal to generate a local system clock of a network device. A next-hop clock synchronization node extracts a clock signal from a physical-layer serial code stream sent by a previous-hop clock synchronization node to generate a system clock of the next-hop clock synchronization node. For example, a phase-locked loop (PLL) is integrated into an interface circuit of the next-hop clock synchronization node, and a clock signal sent by the previous-hop clock synchronization node is used as an input signal of the PLL to generate a system clock whose frequency is the same as a frequency of the clock signal sent by the previous-hop clock synchronization node.

For example, alternatively, the method for obtaining a clock signal to generate a local system clock may include obtaining a timestamp from a packet sent by a previous-hop clock synchronization node, and generating a system clock based on the timestamp. For a specific implementation of generating a system clock based on a timestamp, refer to the Precision Time Protocol (PTP), for example, the Institute of Electrical and Electronics Engineers (IEEE) standard 1588.

Persons skilled in the art that may understand that, in the solution of performing clock synchronization using a PLL, a network device obtains a clock signal from a previous-hop clock synchronization node of the network device, then checks a local system clock of the network device based on the clock signal, and sends a clock signal generated by the local system clock of the network device to a next-hop clock synchronization node of the network device. In the solution of performing clock synchronization based on a timestamp, a network device may check a local system clock of the network device based on a timestamp sent by a previous-hop clock synchronization node, then generate a new timestamp using the local system clock of the network device, and send the new timestamp to a next-hop clock synchronization node of the network device, or the network device may directly transparently transmit, to the next-hop clock synchronization node of the network device, a packet that carries the timestamp and that is sent by the previous-hop clock synchronization node of the network device. That is, the clock signal sent by the network device to the next-hop clock synchronization node may be directly transparently transmitted without being processed by the network device, or may be generated by the local system clock that is of the network device and that is obtained after clock synchronization.

Figure 2:
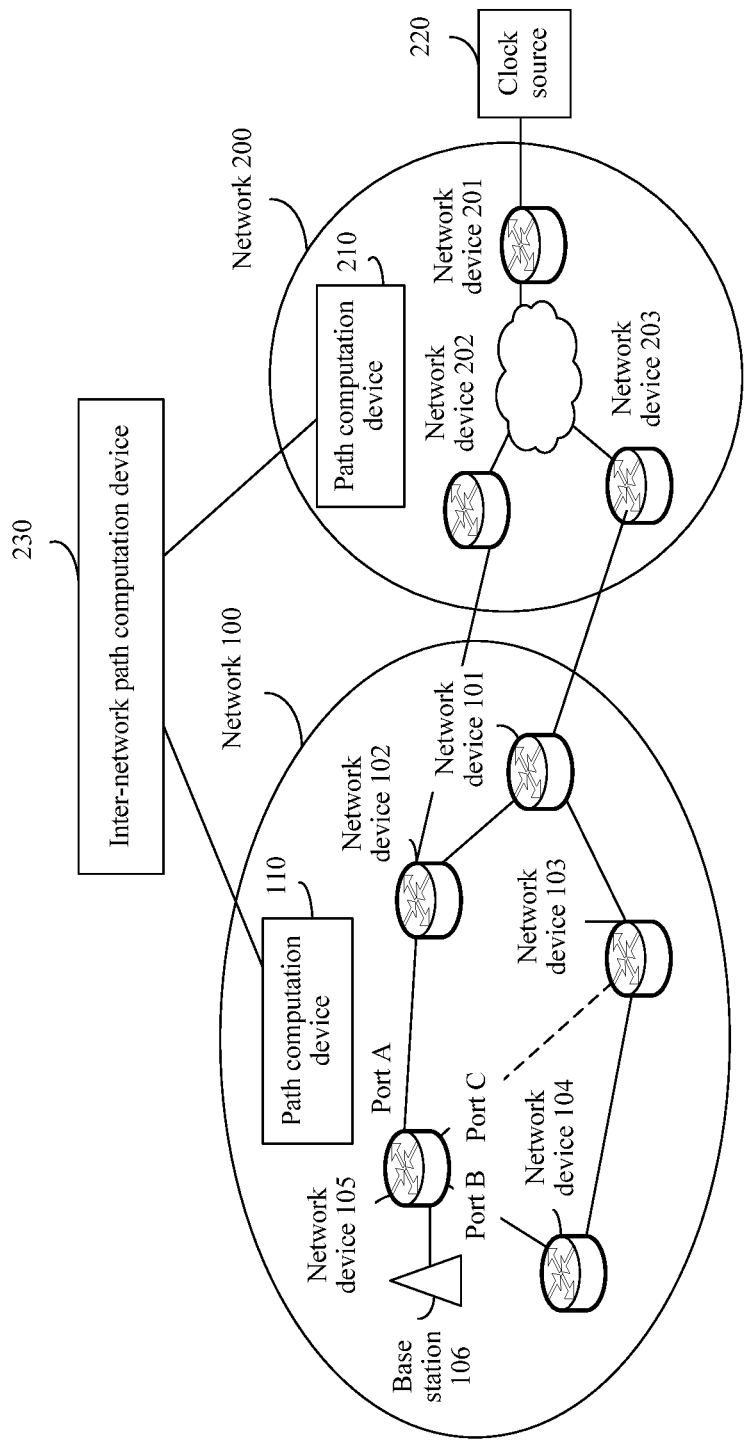
FIG. 2 is a schematic diagram of another application scenario according to an embodiment of this application.

FIG. 2 is a schematic diagram of another application scenario according to an embodiment of this application. A network 100 and a network 200 are two network domains in a network. The network 100 may be a carrier network or a part of a carrier network, or the network 100 may be an enterprise network or a part of an enterprise network. The network 200 may be a carrier network or a part of a carrier network, or the network 200 may be an enterprise network or a part of an enterprise network. The network 100 and the network 200 both may be network domains in a carrier network. Alternatively, the network 100 and the network 200 may be respectively a network domain in a carrier network and a network domain in an enterprise network. The network 100 and the network 200 both may be network domains in an enterprise network. For example, the network 100 and the network 200 may be two ASs defined according to the BGP, or may be two network domains obtained through division performed by a network manager based on a network topology structure. A path computation device 110 computes a clock synchronization path for a network device in the network 100 based on a clock synchronization capability of each network device in the network 100 and a clock synchronization requirement. A path computation device 210 computes a clock synchronization path for a network device in the network 200 based on a clock synchronization capability of each network device in the network 200 and a clock synchronization requirement. For example, the network 100 in FIG. 2 may be the network 100 shown in FIG. 1.

The path computation device 110 may be located within or outside the network 100. The path computation device 210 may be located within or outside the network 200.

The path computation device 110 and the path computation device 210 separately communicate with an inter-network path computation device 230. The inter-network path computation device 230 may be an independent physical device such as a server. Alternatively, the inter-network path computation device 230 may be a function module of a network device. The inter-network path computation device 230 may be located within the network 100 or the network 200, or the inter-network path computation device 230 may be located outside the network 100 and the network 200. The inter-network path computation device 230 is configured to determine a clock injection node for each network, and the clock injection node is configured to obtain a clock synchronization path of a clock signal.

Similar to FIG. 1, a first network device that obtains a clock signal from a clock source or a network device in another network is referred to as a clock injection node of the network. For example, it is assumed that a network device 101 is a network device in the network 100, and the network device 101 obtains clock information from a network device 203 in the network 200. The network device 101 is a first network node that is in the network 100 and that obtains a clock signal from a device in the network 200, and therefore the network device 101 is referred to as a clock injection node of the network 100. Certainly, persons skilled in the art may understand that one edge network device may be located in a plurality of networks, and serves as a clock injection node of at least one of the plurality of networks to provide a clock signal for the at least one network.

It is assumed that no clock source or no device that is directly connected to a clock source exists in the network 100. Before computing a clock synchronization path for a network device in the network 100, the path computation device 110 needs to first request the inter-network path computation device 230 to determine a clock injection node for the network 100, and then compute a clock synchronization path from the clock injection node of the network 100 to another network device in the network 100 based on a clock synchronization topology of the network 100.

The inter-network path computation device 230 may store clock synchronization topologies of network devices in the plurality of networks. For example, the inter-network path computation device 230 stores a clock synchronization topology of a network device in the network 100 and a clock synchronization topology of a network device in the network 200. The clock synchronization topology of the network device in the network 100 and the clock synchronization topology of the network device in the network 200 may be prestored in the inter-network path computation device 230, or may be respectively sent by the path computation device 110 and the path computation device 210 to the inter-network path computation device 230. Optionally, the inter-network path computation device 230 may store only edge network devices that have the clock synchronization capability in the network 100 and the network 200, ports that are of the edge network devices and that have the clock synchronization capability, and a connection relationship between the edge network devices that are connected using the ports that have the clock synchronization capability.

Figure 3:
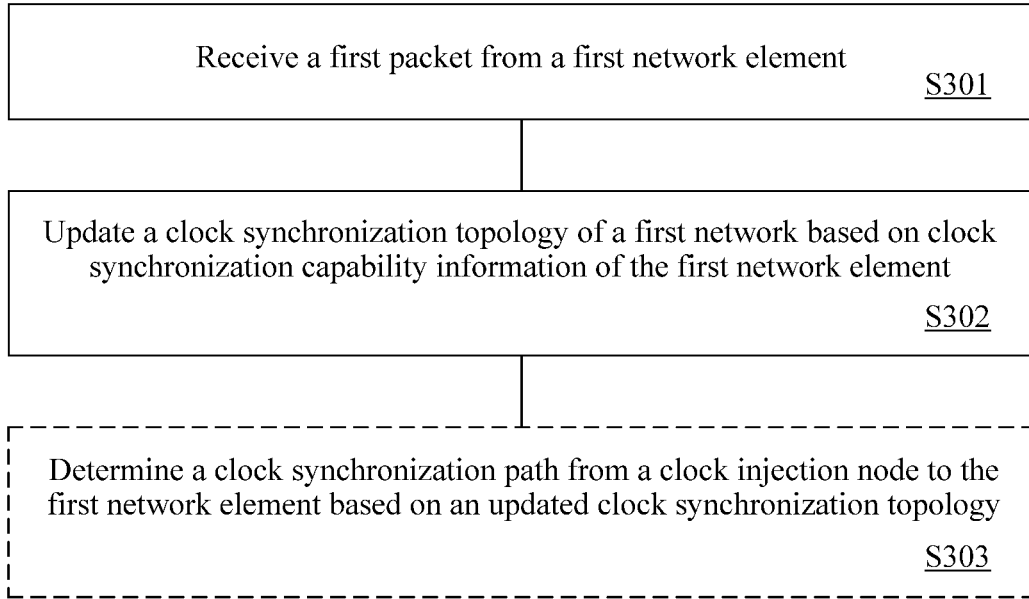
FIG. 3 is a flowchart of a method for updating a clock synchronization topology according to an embodiment of this application.

FIG. 3 is a flowchart of a method for updating a clock synchronization topology according to an embodiment of this application. For example, the method may be applied to the network 100 shown in FIG. 1, and may also be applied to the network 100 shown in FIG. 2 or the network 200 shown in FIG. 2. An example in which the method is applied to the network 100 shown in FIG. 1 is used for description. For example, a first network element in FIG. 3 may be the network device 105 shown in FIG. 1, and a clock injection node of a first network in FIG. 3 may be the network device 101 shown in FIG. 1.

The method for updating a clock synchronization topology of a network provided in FIG. 3 includes steps S301 and S302. For example, steps S301 and S302 may be performed by the path computation device 110 shown in FIG. 1.

Step S301. Receive a first packet from a first network element, where the first packet includes clock synchronization capability information of the first network element, the first network element is a network element in a first network, and the first network element has a clock synchronization capability.

In this application, clock synchronization capability information of a network element may include a clock synchronization protocol supported by the network element. Optionally, the clock synchronization capability information of the network element may further include information about a port of the network element, and a clock synchronization protocol supported by each port of the network element.

Optionally, the clock synchronization capability information of the first network element includes information about at least one port that has the clock synchronization capability in the first network element.

For example, the first network element may be the network device 105 shown in FIG. 1, and the network device 105 includes a port A, a port B, and a port C. The network device 105 communicates with a network device 102 using the port A, communicates with a network device 104 using the port B, and communicates with a network device 103 using the port C. Information carried in the first packet includes that the network device 105 has the clock synchronization capability, the port A and the port B have the clock synchronization capability, and the port C does not have the clock synchronization capability. Persons skilled in the art may understand that the first packet may merely indicate that the port A and the port B have the clock synchronization capability. The first network element includes at least one port that has the clock synchronization capability. The first network element has the clock synchronization capability.

For example, the first packet may carry only indication information indicating that the first network element has the clock synchronization capability, and does not carry synchronization capability information of a port. After receiving the first packet, the path computation device 110 determines all ports that have the clock synchronization capability in the first network element.

Optionally, the first packet is a PCEP packet, and the clock synchronization capability information is carried in the PCEP packet.

Step S302. Update a clock synchronization topology of the first network based on the clock synchronization capability information of the first network element.

For example, the clock synchronization topology of the first network is stored in a memory of the path computation device 110 shown in FIG. 1.

In a possible example, the path computation device 110 does not obtain the clock synchronization capability information of the first network element before step S301, and therefore the clock synchronization topology of the first network before the updating does not include the first network element. For example, the first network element is a network device that is newly added to the network 100, and the first packet is a packet sent when the first network element reports clock synchronization capability information for the first time after a connection is established between the first network element and the path computation device 110. In an updated clock synchronization topology, the path computation device 110 adds the first network element, the port that has the clock synchronization capability in the first network element, and a connection relationship between the port that has the clock synchronization capability in the first network element and a port that has the clock synchronization capability in another network device with the clock synchronization capability.

In another possible example, the path computation device 110 adds, to the clock synchronization topology of the first network before the updating, the first network element and several ports that have the clock synchronization capability in the first network element. In the first network element, if some ports that originally have the clock synchronization capability lose the clock synchronization capability due to some port faults, or some ports that originally do not have a clock synchronization function enable the clock synchronization function due to a service requirement, the first network element sends the first packet to the path computation device 110. The path computation device 110 adjusts the clock synchronization topology of the first network based on whether the first network element has the clock synchronization capability. For example, the path computation device 110 deletes, from the clock synchronization topology of the first network, a port that does not have the clock synchronization capability in the first network element anymore and a connection relationship with the port, or adds, to the clock synchronization topology of the first network, a port that originally does not have a clock synchronization function but enables the clock synchronization function in the first network element and a connection relationship with the port.

In another possible example, the path computation device 110 adds, to the clock synchronization topology of the first network before the updating, the first network element and several ports that have the clock synchronization capability in the first network element. For example, if a port that originally has the clock synchronization capability in the first network element loses the clock synchronization capability due to some reasons, or a port that originally has a clock synchronization function disables the clock synchronization function due to a service requirement, the first network element sends the first packet to the path computation device 110. The path computation device 110 adjusts the clock synchronization topology of the first network based on whether the first network element has the clock synchronization capability. For example, the path computation device 110 deletes the first network element from the clock synchronization topology of the first network.

Persons skilled in the art may understand that the path computation device further needs to obtain topology information of the first network to update the clock synchronization topology based on the clock synchronization capability information of the first network element. For example, when the clock synchronization topology is a topology including physical links, the path computation device further needs to obtain physical topology information of the first network. The physical topology information includes a physical port of the first network element and a connection relationship between the physical port and another physical port of another network device. For example, when the clock synchronization topology is a topology including logical links, the path computation device further needs to obtain logical topology information of the first network. The logical topology information includes a logical port of the first network element and a relationship between logical links established between the logical port and another network device. The topology information of the first network element may be prestored in the path computation device, or may be sent by the first network element to the path computation device. When the topology information of the first network element is sent by the first network element to the path computation device, the topology information may be carried in the first packet, or may be carried in another packet.

Optionally, the updated clock synchronization topology includes a clock injection node of the first network, and the method further includes the following step.

Step S303: Determining a clock synchronization path from the clock injection node to the first network element based on the updated clock synchronization topology. For example, step S303 may be performed by the path computation device 110 in the network 100.

For example, the path computation device determines a computation policy of the clock synchronization path from the clock injection node to the first network element based on the updated clock synchronization topology. The computation policy may be prestored in the path computation device, may be sent by the first network element to the path computation device, or may be sent by a controller to the path computation device. The controller may be the inter-network path computation device in FIG. 2.

For example, the path computation policy may be a path computation policy of a point-to-multipoint (P2MP) multi-protocol label switching (MPLS) traffic engineering (TE) label switched path (LSP) or a path computation policy of a generalized multiprotocol label switching (GMPLS) TE LSP. For example, the path computation device 110 uses, as an ingress node of the TE LSP, a clock injection node of the network 100 such as the network device 101, and uses, as an egress node of the TE LSP, the first network element such as the network device 105 to perform path computation. For a specific path computation method, refer to descriptions in RFC 6006.

For example, the path computation policy may be obtaining a shortest path from the clock injection node to the first network element. For example, if each of the network devices 101, 102, 103, 104, and 105 in FIG. 1 includes a port that has the clock synchronization capability, a path includes the network device 101→the network device 102→the network device 105 in FIG. 1 is a shortest path. Therefore, the path computation device determines that a previous-hop clock synchronization node of the network device 105 is the network device 102, and the network device 105 obtains a clock signal from the network device 102 using the port A.

For example, after determining the clock synchronization path from the clock injection node to the first network element, the path computation device sends first instruction information to the first network element. The first instruction information is used to instruct the first network element to obtain a clock signal from a previous-hop clock synchronization node of the first network element on the clock synchronization path. Optionally, the path computation device may further send second instruction information to the previous-hop clock synchronization node of the first network element on the clock synchronization path. The second instruction information is used to instruct the previous-hop clock synchronization node of the first network element on the clock synchronization path to send a clock signal to the first network element.

Figure 4:
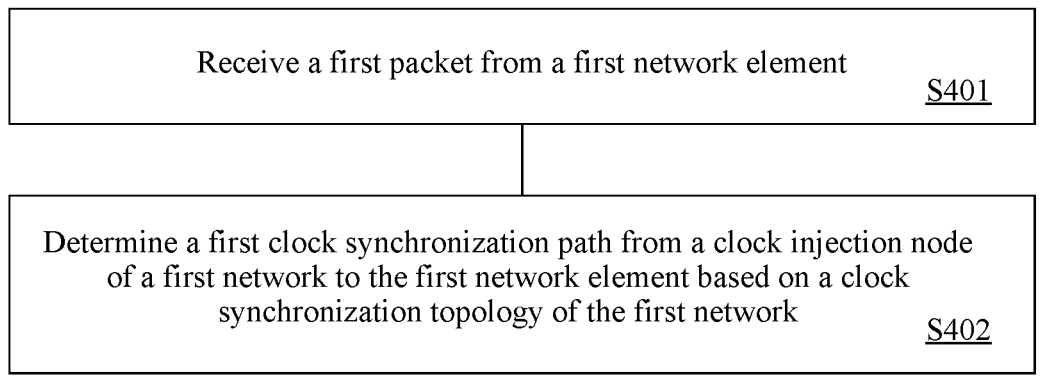
FIG. 4 is a flowchart of a method for determining a clock synchronization path according to an embodiment of this application.

FIG. 4 is a flowchart of a method for determining a clock synchronization path according to an embodiment of this application. For example, the method in FIG. 4 may be applied to the network 100 shown in FIG. 1, and may also be applied to the network 100 shown in FIG. 2 or the network 200 shown in FIG. 2. An example in which the method is applied to the network 100 shown in FIG. 1 is used for description. A first network element in FIG. 4 may be the network device 105 in FIG. 1. Steps in FIG. 4 may be performed by the path computation device 110 shown in FIG. 1. The method includes steps S401 and S402.

Step S401. Receive a first packet from a first network element, where the first packet is used to request to determine a clock synchronization path for the first network element, the first network element is a network element in a first network, and the first network element has a clock synchronization capability.

For example, the first packet is a PCEP packet.

Step S402. Determine a first clock synchronization path from a clock injection node of the first network to the first network element based on a clock synchronization topology of the first network, where the clock synchronization topology of the first network includes the clock injection node and the first network element.

Further, the clock synchronization topology of the first network includes a plurality of network devices that have the clock synchronization capability in the first network, ports that have the clock synchronization capability and that are of the plurality of network devices with the clock synchronization capability, and a connection relationship between the plurality of network devices that have the clock synchronization capability and that are connected to each other using the ports that have the clock synchronization capability.

For example, the clock synchronization topology of the first network may be prestored in the path computation device 110, or may be generated after the path computation device 110 obtains, in the manner shown in FIG. 3, clock synchronization capability information from network devices that have the clock synchronization capability in the network 100.

The first network element has the clock synchronization capability, and therefore the clock synchronization topology of the first network includes the first network element. The clock synchronization topology of the first network further includes the clock injection node of the first network.

A path computation policy for determining the first clock synchronization path from the clock injection node of the first network to the first network element may be the same as a path computation policy in step S303 in FIG. 3.

In a possible example, the first network element is not on any clock synchronization path before step S401, and the first packet is used to request the path computation device 110 to compute a clock synchronization path for the first network element.

In another possible example, the first network element is on a second clock synchronization path from the clock injection node of the first network to the first network element before step S401, and the first packet is further used to indicate that the second clock synchronization path from the clock injection node to the first network element is faulty. For example, the clock injection node on the second clock synchronization path is a network device 101, the network device 101 sends a clock signal to a network device 102, and the network device 102 sends the clock signal to the network device 105 using a port A of the network device 105.

That the second clock synchronization path is faulty may be that the first network element detects that the second clock synchronization path cannot provide a correct clock signal for the first network element, or may be that the first network element detects that a local system clock signal of the first network element is degraded. To be specific, that the second clock synchronization path is faulty includes, a network device other than the first network element on the second clock synchronization path is faulty, a link between two network devices is faulty, or a port A of the first network element is faulty. That the port A of the first network element is faulty may include, the port A cannot receive a clock signal normally, or a board of the port A cannot normally process a clock signal after the port A of the first network element receives the clock signal.

For example, when the first packet in step S401 carries information indicating that the second clock synchronization path is faulty, the first clock synchronization path determined in step S402 includes at least one network element that is not on the second clock synchronization path. For example, the path computation device 110 determines, based on a case in which the clock synchronization topology of the first network further includes a port B of the network device 105, that the first clock synchronization path is a synchronization path, the network device 101→the network device 103→the network device 104→the port B of the network device 105.

Figure 5:
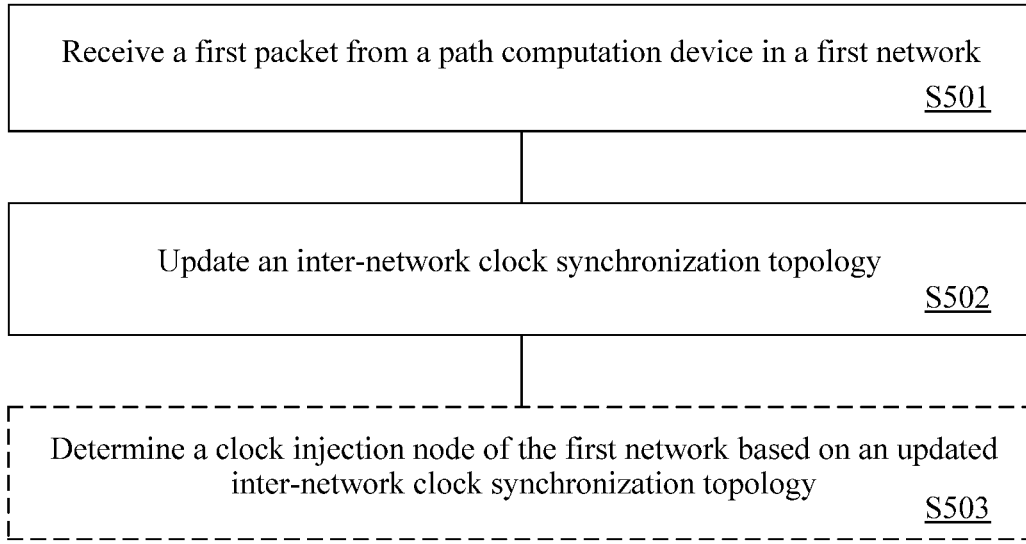
FIG. 5 is a flowchart of a method for updating an inter-network clock synchronization topology according to an embodiment of this application.

FIG. 5 is a flowchart of a method for updating an inter-network clock synchronization topology according to an embodiment of this application. For example, the method may be applied to the scenario shown in FIG. 2. For example, steps of the method in FIG. 5 may be performed by the inter-network path computation device 230 shown in FIG. 2. A path computation device in a first network in the method in FIG. 5 may be the path computation device 110 shown in FIG. 2, and a first edge network device network in FIG. 5 may be the network device 101 in FIG. 2. The method includes steps S501 and S502.

Step S501. Receive a first packet from a path computation device in a first network, where the first packet includes clock synchronization capability information of a first network element in the first network.

For example, a specific type of the clock synchronization capability information of the first network element may be the same as a specific type of the synchronization capability information of the first network element in step S301 in FIG. 3. For example, the clock synchronization capability information of the first network element includes information about at least one port that has a clock synchronization capability in the first network element.

Optionally, the first packet is a PCEP packet.

In a possible example, the first network element is a first edge network device in the first network. For example, the path computation device 110 sends only clock synchronization capability information of an edge network device in the first network to the inter-network path computation device 230, and does not send clock synchronization capability information of a network device in the network.

In another possible example, the first network element may be any network device in the first network. For example, the path computation device 110 sends, to the inter-network path computation device 230, clock synchronization capability information of all network devices in the first network or all network devices that have the clock synchronization capability.

Step S502. Update an inter-network clock synchronization topology based on the clock synchronization capability information of the first network element.

For example, the inter-network clock synchronization topology may be stored in the inter-network path computation device 230 shown in FIG. 2.

In a possible example, the inter-network clock synchronization topology includes edge network devices that have the clock synchronization capability in each of a plurality of networks, ports that have the clock synchronization capability and that are of the edge network devices with the clock synchronization capability, and a connection relationship between the edge network devices that have the clock synchronization capability and that are connected to each other using the ports that have the clock synchronization capability.

In another possible example, the inter-network clock synchronization topology includes a clock synchronization topology of each of a plurality of networks, edge network devices that have the clock synchronization capability in each of the plurality of networks, ports that have the clock synchronization capability and that are of the edge network devices with the clock synchronization capability, and a connection relationship between the edge network devices that have the clock synchronization capability and that are connected to each other using the ports that have the clock synchronization capability.

In a possible example, the inter-network path computation device 230 does not obtain clock synchronization capability information of any network device in the first network before S501, and therefore the inter-network clock topology before the updating does not include the clock synchronization topology of the first network.

In another possible example, the inter-network clock synchronization topology before the updating includes a network device in the first network, or includes only an edge network device in the first network. The path computation device in the first network sends the first packet in step S501 because the clock synchronization capability information of the first network element changes.

Persons skilled in the art may understand that the path computation device further needs to obtain topology information of the first network to update the clock synchronization topology based on the clock synchronization capability information of the first network element. For example, when the clock synchronization topology is a topology including physical links, the path computation device further needs to obtain physical topology information of the first network. The physical topology information includes a physical port of the first network element and a connection relationship between the physical port and another physical port of another network device. For example, when the clock synchronization topology is a topology including logical links, the path computation device further needs to obtain logical topology information of the first network. The logical topology information includes a logical port of the first network element and a relationship between logical links established between the logical port and another network device. The topology information of the first network element may be prestored in the path computation device, or may be sent by the first network element to the path computation device. When the topology information of the first network element is sent by the first network element to the path computation device, the topology information may be carried in the first packet, or may be carried in another packet.

Optionally, an updated inter-network clock synchronization topology further includes a clock injection node of a second network and a second edge network device that has the clock synchronization capability in the first network, and the method further includes the following step.

Step S503: Determining a clock injection node of the first network based on the updated inter-network clock synchronization topology.

Optionally, the clock injection node of the first network may be the second edge network device, or may be another edge network device in the first network. Optionally, when the clock injection node of the second network is an edge network device located in the first network and the second network, the clock injection node of the first network is a clock injection node of the second network.

For example, the first network element may be a network device the same as or different from the second edge network device.

For example, the second network is the network 200 in FIG. 2, and the first network is the network 100 in FIG. 2. The second edge network device is the network device 101, and a third edge network device is a network device 203. A specific implementation in which the inter-network path computation device 230 determines that the network device 101 is the clock injection node of the first network may be the specific implementation in FIG. 6.

Figure 6:
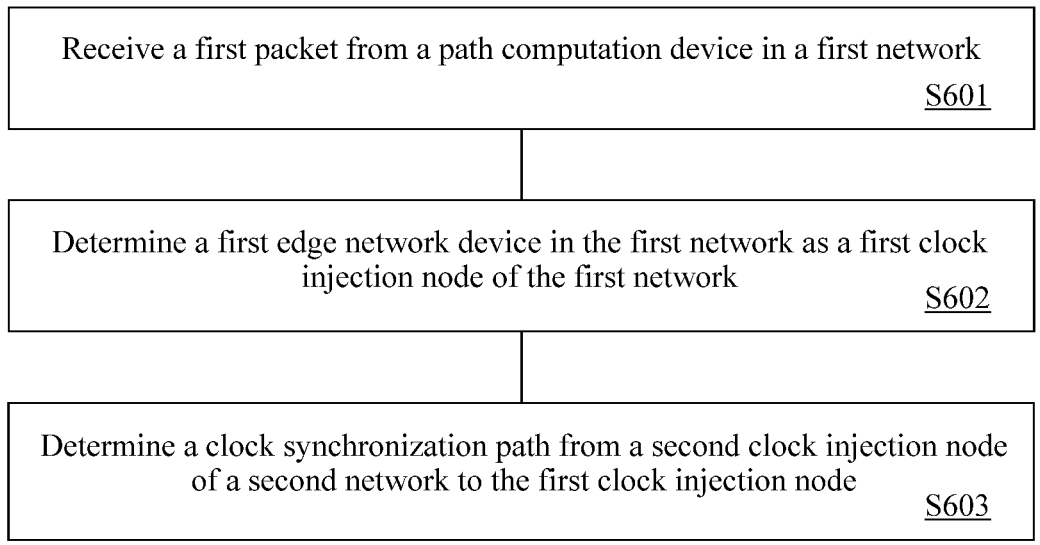
FIG. 6 is a flowchart of another method for determining a clock synchronization path according to an embodiment of this application.

FIG. 6 is a flowchart of another method for determining a clock synchronization path according to an embodiment of this application. For example, the method shown in FIG. 6 may be applied to the scenario shown in FIG. 2. The method includes steps S601, S602, and S603. Steps of the method may be performed by the inter-network path computation device 230 in FIG. 2.

Step S601. Receive a first packet from a path computation device in a first network, where the first packet is used to request to determine a clock injection node of the first network.

For example, the first network may be the network 100 in FIG. 2, and the path computation device in the first network may be the path computation device 110. It is assumed that there is no clock source in the network 100. The path computation device 110 in the first network sends the first packet to the inter-network path computation device 230, and requests the inter-network path computation device 230 to determine the clock injection node for the first network based on an inter-network clock synchronization topology. The clock injection node of the first network needs to obtain a clock signal from a network device outside the first network.

For example, the first packet is a PCEP packet.

Step S602. Determine a first edge network device in the first network as a first clock injection node of the first network based on an inter-network clock synchronization topology, where the inter-network clock synchronization topology includes the first edge network device and a second clock injection node of a second network.

Further, the second network is an upstream network of the first network. The clock injection node of the first network obtains a clock signal from a network device that has a clock synchronization capability in the second network.

In this application, if a clock injection node of a network (for example, a network 1) obtains a clock signal from a network device in another network (for example, a network 2), the network 1 is referred to as a downstream network of the network 2, and the network 2 is referred to as an upstream network of the network 1.

For example, when determining a clock injection node for each network, the inter-network path computation device 230 first computes a clock injection node of an upstream network, and then computes a clock injection node of a downstream network. In an example, an upstream-downstream relationship between networks is preconfigured in the inter-network path computation device 230 by a network manager. In another example, an upstream-downstream relationship between networks is computed by the inter-network path computation device 230 using a method the same as a method for computing a clock synchronization path of a network device. In the method, each network is used as a node, a network in which a clock source exists is used as a clock injection node, and two networks in which an edge network device in one network is connected to an edge network device in the other network are used as interconnected nodes.

In a possible example, the inter-network clock synchronization topology includes edge network devices that have the clock synchronization capability in each of a plurality of networks, ports that have the clock synchronization capability and that are of the edge network devices with the clock synchronization capability, and a connection relationship between the edge network devices that have the clock synchronization capability and that are connected to each other using the ports that have the clock synchronization capability. The plurality of networks include the first network and the second network.

In another possible example, the inter-network clock synchronization topology includes a clock synchronization topology of each of a plurality of networks, edge network devices that have the clock synchronization capability in each of the plurality of networks, ports that have the clock synchronization capability and that are of the edge network devices with the clock synchronization capability, and a connection relationship between the edge network devices that have the clock synchronization capability and that are connected to each other using the ports that have the clock synchronization capability. The plurality of networks include the first network and the second network.

For example, the inter-network clock synchronization topology may further include a clock source. The clock source may be located in the second network, or may be located outside the first network and the second network. The clock injection node of the second network may be determined by the inter-network path computation device and recorded in the inter-network clock synchronization topology before step S602.

Step S603. Determine a clock synchronization path from the second clock injection node to the first clock injection node.

In a possible example, as described in step S602, the inter-network clock synchronization topology includes only a clock topology of an edge network device in the first network and the second network. For example, in the application scenario in FIG. 2, the inter-network clock synchronization topology includes a clock injection node of the network 200, that is, a network device 201, and an edge network device 202 and an edge network device 203 in the network 200. The inter-network clock synchronization topology further includes an edge device in the network 100, for example, a network device 101 and a network device 102. In the inter-network synchronization topology, the network device 101 is connected to the network device 203, and the network device 102 is connected to the network device 202.

In this example, it is assumed that the inter-network clock synchronization topology does not include a network device inside the network. Therefore, the inter-network path computation device 230 cannot directly determine a clock synchronization path from the clock injection node of the network 200 to the edge network device 202 or the edge network device 203. Therefore, the inter-network path computation device 230 sends a query packet to the path computation device 210, and determines a clock synchronization path from the network device 201 to the network device 202, or a clock synchronization path from the network device 201 to the network device 203. If the path computation device 210 determines that there is a clock synchronization path from the network device 201 to the network device 202 and there is a clock synchronization path from the network device 201 to the network device 203, the inter-network path computation device 230 may select either the network device 101 or the network device 102 as the clock injection node of the network 100. Optionally, the inter-network path computation device 230 selects, from the network device 101 and the network device 102 as the clock injection node of the network 100, a network device that has a relatively small quantity of hops to the network device 201. If the path computation device 210 determines that there is no clock synchronization path from the network device 201 to the network device 202 and there is a clock synchronization path from the network device 201 to the network device 203, the inter-network path computation device 230 determines, as the clock injection node of the network 100, the network device 101 connected to the network device 203.

For example, a clock synchronization path determined by the inter-network path computation device 230 for a first clock injection node (the network 101) of the network 100 includes a clock synchronization path from the network device 201 to the network device 203 and a clock synchronization path from the network device 203 to the network device 101. The two clock synchronization paths are both computed by the path computation device 210.

For example, the path computation device 210 may report, to the inter-network path computation device 230, specific network devices on the clock synchronization path from the network device 201 to the network device 203, or the path computation device 210 may store the clock synchronization path from the network device 201 to the network device 203 and an identifier of the clock synchronization path, and send only the identifier of the clock synchronization path to the inter-network path computation device 230.

In another example, as described in step S602, the inter-network clock synchronization topology includes a clock topology of an edge network device in the first network and the second network, and further includes clock topologies of non-edge network devices in the first network and the second network. The inter-network path computation device implements steps S602 and S603 based on the inter-network clock synchronization topology in a manner similar to the manner used by the inter-network path computation device 230 and the path computation device 210 in the foregoing example.

Persons skilled in the art may understand that steps S602 and S603 may be simultaneously implemented.

For example, after determining the first edge network device as the clock injection node of the first network, the inter-network path computation device sends first instruction information to the first path computation device. The first instruction information is used to instruct the path computation device in the first network to use the first edge network device as the first clock injection node of the first network, and the first instruction information may further include an identifier of a network device of a previous-hop clock synchronization path node of the first edge network device. Then the path computation device in the first network sends second instruction information to the first edge network device. The second instruction information is used to instruct the first edge network device to obtain a clock signal from the previous-hop clock synchronization path node.

Optionally, the first packet further includes an identifier of a third clock injection node of the first network, and the third clock injection node and the first clock injection node are different edge network devices. Further, the first packet in step S601 is further used to instruct the inter-network path computation device to determine, as the clock injection node of the first network, an edge network device different from the third clock injection node for the first network.

In a possible example, the path computation device in the first network receives alarm information reported by a downstream node of the third clock injection node, determines that performance of a clock signal provided by the third clock injection node for another network device in the first network is degraded or the third clock injection node cannot provide a correct clock signal for another network device, and sends the first packet to request to redetermine the clock injection node of the first network.

In another possible example, the path computation device in the first network receives alarm information reported by the third clock injection node, determines that performance of a clock signal received by the third clock injection node from a previous-hop clock synchronization node of the third clock injection node is degraded or abnormal, and sends the first packet to request to redetermine the clock injection node of the first network.

In still another possible example, a network device that is on the clock synchronization path and that is in the first network detects that a previous-hop clock synchronization node of the network device is faulty, and requests the path computation device in the first network to recompute a synchronization path. The path computation device in the first network determines that a new synchronization path cannot be obtained through recomputation using the third clock injection node or a new synchronization path has excessive hops. Therefore, the path computation device in the first network sends the first packet to the inter-network path computation device to request to redetermine the clock injection node of the first network or to add a new clock injection node to the first network. For example, the network device 102 is the third clock injection node, and the network device 105 obtains a clock signal from a port A. The port A of the network device 105 is faulty. The path computation device 110 is requested to recompute a clock synchronization path for the network device 105. When the network device 102 is used as a clock injection node, the path computation device 110 determines that another possible clock synchronization path, to be specific, a clock synchronization path includes the network device 101→the network device 103→the network device 104→the network device 105 includes excessive hops, and sends the first packet to the inter-network path computation device 230. The inter-network path computation device 230 changes the clock injection node of the network 100 to the network device 101.

Figure 7:
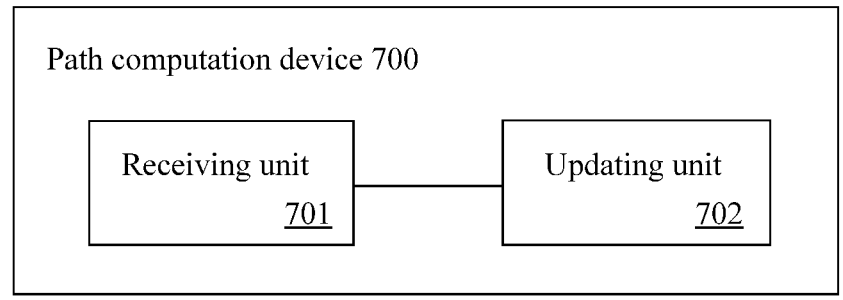
FIG. 7 is a schematic structural diagram of a path computation device according to an embodiment of this application.

FIG. 7 is a schematic structural diagram of a path computation device according to an embodiment of this application. As shown in FIG. 7, a path computation device 700 includes a receiving unit 701 and an updating unit 702.

The receiving unit 701 is configured to receive a first packet from a first network element. The first packet includes clock synchronization capability information of the first network element, the first network element is a network element in a first network, and the first network element has a clock synchronization capability. The receiving unit 701 may be a network interface, for example, a network interface 801 shown in FIG. 8.

The updating unit 702 is configured to update a clock synchronization topology of the first network based on the clock synchronization capability information of the first network element from the receiving unit 701.

Optionally, the clock synchronization capability information of the first network element includes information about at least one port that has the clock synchronization capability in the first network element.

Optionally, the path computation device 700 further includes a determining unit (not shown), and the determining unit is configured to determine a clock synchronization path from a clock injection node to the first network element based on an updated clock synchronization topology.

The path computation device 700 provided in this embodiment may be applied to the application scenario shown in FIG. 1 or FIG. 2, to implement a function of the path computation device 110 or the path computation device 210. The path computation device 700 may be configured to perform the method in the embodiment of FIG. 3, to implement the method in the embodiment of FIG. 3. For another additional function that can be implemented by the path computation device and a process of interaction with another device, refer to descriptions of the path computation device in the method embodiment of FIG. 3. Details are not described herein again.

Figure 8:
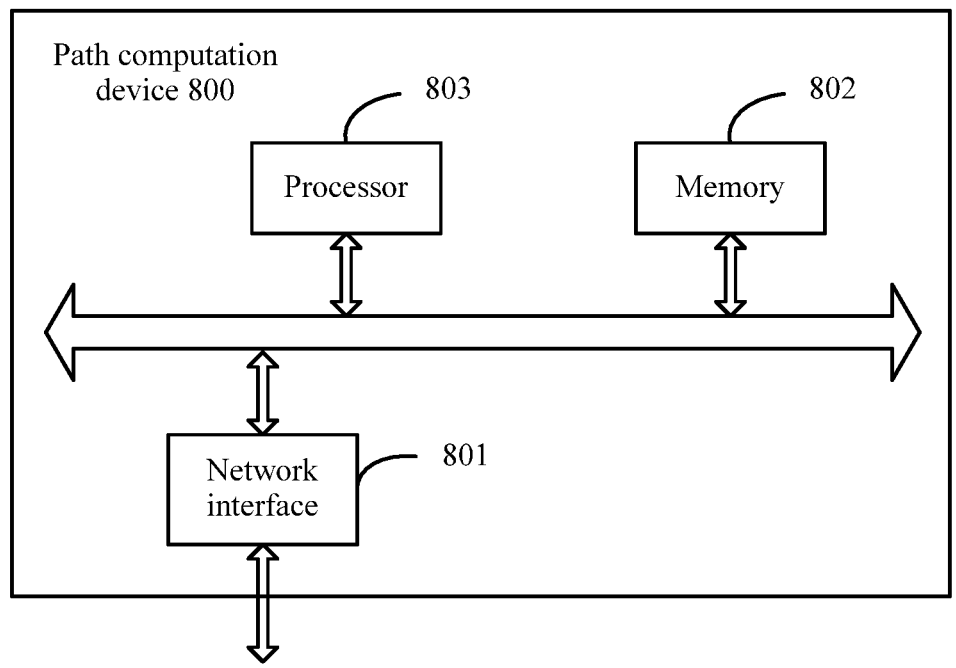
FIG. 8 is a schematic structural diagram of another path computation device according to an embodiment of this application.

FIG. 8 is a schematic structural diagram of another path computation device 800 according to an embodiment of this application. As shown in FIG. 8, a path computation device 800 includes a network interface 801, a memory 802, and a processor 803. For example, the path computation device 800 may be a separate server. The path computation device 800 may alternatively be a software module or a hardware module of a router, and the network interface, the memory, and the processor are a network interface, a memory, and a processor of the router.

The network interface 801 may be a wired interface, for example, a fiber distributed data interface (FDDI), or an Ethernet interface. The network interface 801 may alternatively be a wireless interface, for example, a wireless local area network interface.

The memory 802 is configured to store a clock synchronization topology of a first network. The memory 802 includes but is not limited to a random access memory (RAM), a read-only memory (ROM), and an erasable programmable ROM (EPROM).

The processor 803 includes but is not limited to one or more of a central processing unit (CPU), a network processor (NP), an application-specific integrated circuit (ASIC), and a programmable logic device (PLD). The PLD may be a complex PLD (CPLD), a field programmable gate array (FPGA), generic array logic (GAL), or any combination thereof.

The memory 802 may be integrated into the processor 803. If the memory 802 and the processor 803 are components independent of each other, the memory 802 is connected to the processor 803. For example, the memory 802 and the processor 803 may communicate using a bus. The network interface 801 and the processor 803 may communicate using a bus, or the network interface 801 may be directly connected to the processor 803.

The processor 803 is configured to perform the following operations of receiving a first packet from a first network element using the network interface 801, where the first packet includes clock synchronization capability information of the first network element, the first network element is a network element in the first network, and the first network element has a clock synchronization capability, and updating the clock synchronization topology of the first network based on the clock synchronization topology of the first network stored in the memory 802 and the clock synchronization capability information of the first network element.

Optionally, the clock synchronization capability information of the first network element includes information about at least one port that has the clock synchronization capability in the first network element.

Optionally, the processor 803 is further configured to determine a clock synchronization path from a clock injection node to the first network element based on an updated clock synchronization topology.

The path computation device 800 shown in FIG. 8 and the path computation device 700 shown in FIG. 7 may be a same apparatus, for example, an execution entity of the method in FIG. 3. It may be considered that FIG. 8 shows content included in a path computation device from a physical perspective, and FIG. 7 shows content included in a path computation device from a logical perspective. Optionally, the receiving unit 701 shown in FIG. 7 may be implemented by the network interface 801 shown in FIG. 8, and the updating unit 702 shown in FIG. 7 may be implemented by the memory 802 and the processor 803 shown in FIG. 8.

Figure 9:
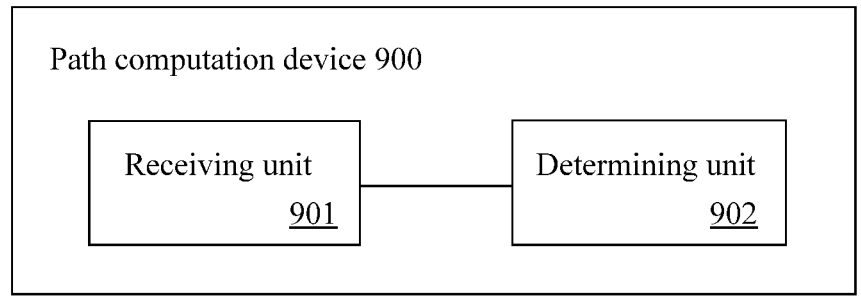
FIG. 9 is a schematic structural diagram of still another path computation device according to an embodiment of this application.

FIG. 9 is a schematic structural diagram of a path computation device 900 according to an embodiment of this application. As shown in FIG. 9, the path computation device 900 includes a receiving unit 901 and a determining unit 902.

The receiving unit 901 is configured to receive a first packet from a first network element. The first packet is used to request to determine a clock synchronization path for the first network element, the first network element is a network element in a first network, and the first network element has a clock synchronization capability.

The determining unit 902 is configured to determine a first clock synchronization path from a clock injection node of the first network to the first network element based on a clock synchronization topology of the first network. The clock synchronization topology of the first network includes the clock injection node and the first network element.

Optionally, the first packet is further used to indicate that a second clock synchronization path from the clock injection node to the first network element is faulty, and the second clock synchronization path includes at least one network element that is not on the first clock synchronization path.

The path computation device 900 provided in this embodiment may be applied to the application scenario shown in FIG. 1 or FIG. 2, to implement a function of the path computation device 110. The path computation device 900 may be configured to perform the method in the embodiment of FIG. 4, to implement the method in the embodiment of FIG. 4. For another additional function that can be implemented by the path computation device and a process of interaction with another device, refer to descriptions of the path computation device in the method embodiment of FIG. 4. Details are not described herein again.

Figure 10:
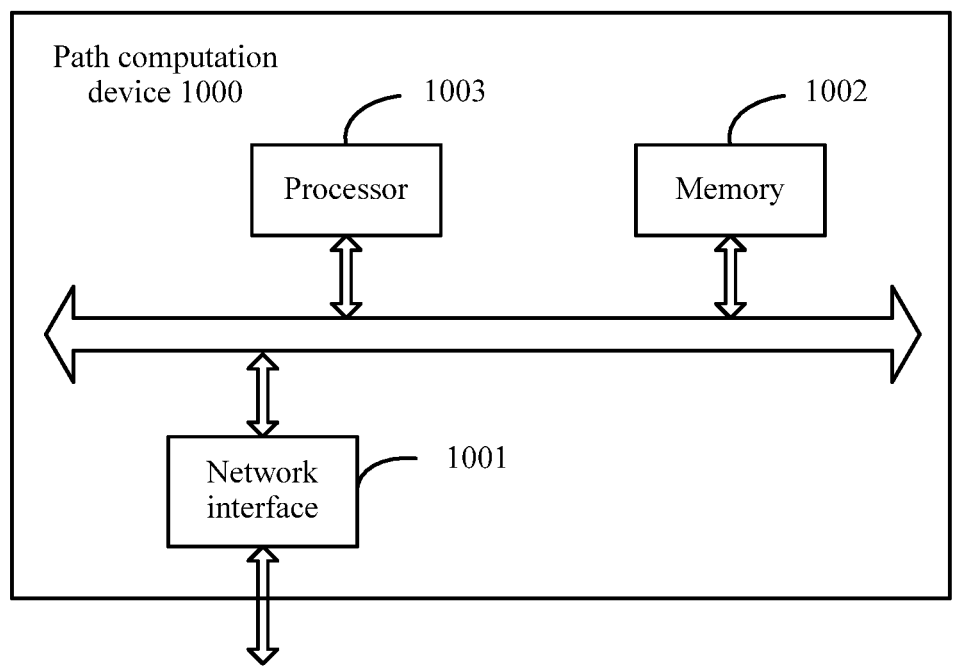
FIG. 10 is a schematic structural diagram of still another path computation device according to an embodiment of this application.

FIG. 10 is a schematic structural diagram of another path computation device 1000 according to an embodiment of this application. As shown in FIG. 10, the path computation device 1000 includes a network interface 1001, a memory 1002, and a processor 1003.

For example, the path computation device 1000 may be a separate server. The path computation device 1000 may alternatively be a software module or a hardware module of a router, and the network interface, the memory, and the processor are a network interface, a memory, and a processor of the router.

The network interface 1001 may be a wired interface, for example, an FDDI, or an Ethernet interface. The network interface 1001 may alternatively be a wireless interface, for example, a wireless local area network interface.

The memory 1002 includes but is not limited to a RAM, a ROM, and an EPROM.

The processor 1003 includes but is not limited to one or more of a CPU, an NP, an ASIC, and a PLD. The PLD may be a CPLD, an FPGA, GAL, or any combination thereof.

The memory 1002 may be integrated into the processor 1003. If the memory 1002 and the processor 1003 are components independent of each other, the memory 1002 is connected to the processor 1003. For example, the memory 1002 and the processor 1003 may communicate using a bus. The network interface 1001 and the processor 1003 may communicate using a bus, or the network interface 1001 may be directly connected to the processor 1003.

The processor 1003 is configured to read a program in the memory 1002 to perform the following operations of receiving a first packet from a first network element using the network interface 1001, where the first packet is used to request to determine a clock synchronization path for the first network element, the first network element is a network element in a first network, and the first network element has a clock synchronization capability, and determining a first clock synchronization path from a clock injection node of the first network to the first network element based on a clock synchronization topology of the first network, where the clock synchronization topology of the first network includes the clock injection node and the first network element.

Optionally, the first packet is further used to indicate that a second clock synchronization path from the clock injection node of the first network to the first network element is faulty, and the second clock synchronization path includes at least one network element that is not on the first clock synchronization path.

The path computation device 1000 shown in FIG. 10 and the path computation device 900 shown in FIG. 9 may be a same apparatus, for example, an execution entity of the method in FIG. 4. It may be considered that FIG. 10 shows content included in a path computation device from a physical perspective, and FIG. 9 shows content included in a path computation device from a logical perspective. Optionally, the receiving unit 901 shown in FIG. 9 may be implemented by the network interface 1001 shown in FIG. 10, and the determining unit 902 shown in FIG. 9 may be implemented by the processor 1003 shown in FIG. 10.

Figure 11:
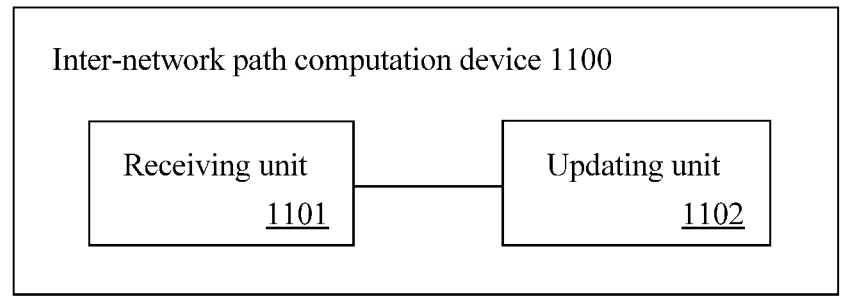
FIG. 11 is a schematic structural diagram of an inter-network path computation device according to an embodiment of this application.

FIG. 11 is a schematic structural diagram of an inter-network path computation device 1100 according to an embodiment of this application. As shown in FIG. 11, the inter-network path computation device 1100 includes a receiving unit 1101 and an updating unit 1102.

The receiving unit 1101 is configured to receive a first packet from a path computation device in a first network. The first packet includes clock synchronization capability information of a first network element in the first network.

The updating unit 1102 is configured to update an inter-network clock synchronization topology based on the clock synchronization capability information of the first network element from the receiving unit 1101.

Optionally, the first network element is a first edge network device in the first network.

Optionally, an updated inter-network clock synchronization topology further includes a clock injection node of a second network and a second edge network device that has a clock synchronization capability in the first network. The path computation device 1100 further includes a determining unit (not shown), and the determining unit is configured to determine a clock injection node of the first network based on the updated inter-network clock synchronization topology.

Optionally, the clock synchronization capability information of the first network element includes information about at least one port that has the clock synchronization capability in the first network element.

The inter-network path computation device 1100 provided in this embodiment may be applied to the application scenario shown in FIG. 2, to implement a function of the inter-network path computation device 230. The inter-network path computation device 1100 may be configured to perform the method in the embodiment of FIG. 5, to implement the method in the embodiment of FIG. 5. For another additional function that can be implemented by the inter-network path computation device 1100 and a process of interaction with another device, refer to descriptions of the inter-network path computation device in the method embodiment of FIG. 5. Details are not described herein again.

Figure 12:
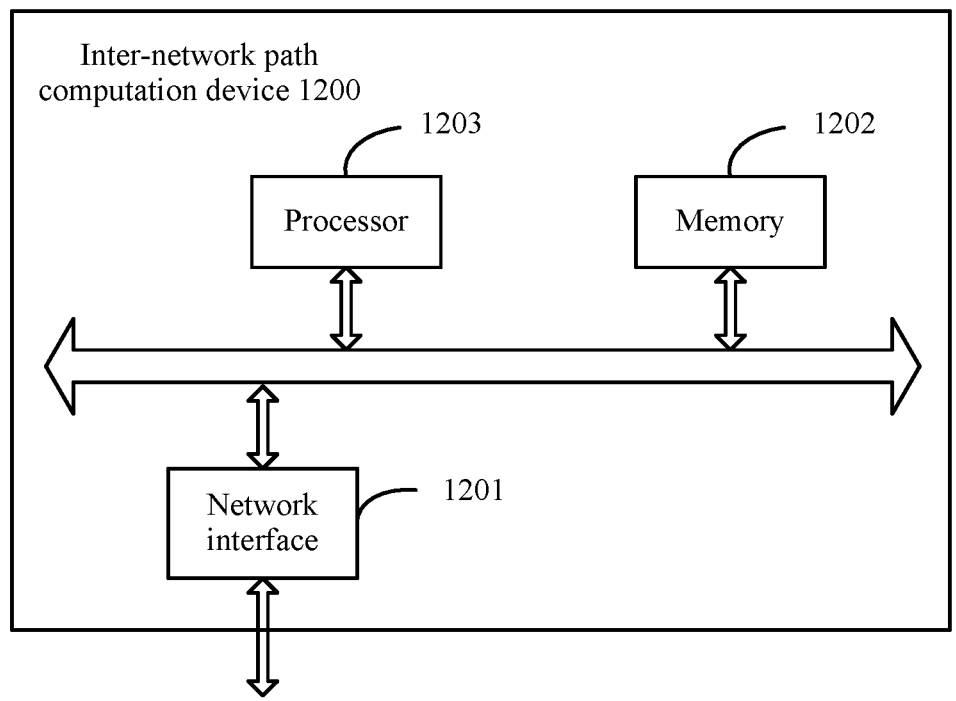
FIG. 12 is a schematic structural diagram of another inter-network path computation device according to an embodiment of this application.

FIG. 12 is a schematic structural diagram of another inter-network path computation device 1200 according to an embodiment of this application. As shown in FIG. 12, the inter-network path computation device 1200 includes a network interface 1201, a memory 1202, and a processor 1203.

For example, the inter-network path computation device 1200 may be a separate server. The inter-network path computation device 1200 may alternatively be a software module or a hardware module of a router, and the network interface, the memory, and the processor are a network interface, a memory, and a processor of the router.

The network interface 1201 may be a wired interface, for example, an FDDI, or an Ethernet interface. The network interface 1201 may alternatively be a wireless interface, for example, a wireless local area network interface.

The memory 1202 is configured to store an inter-network clock synchronization topology. The memory 1202 includes but is not limited to a RAM, a ROM, and an EPROM.

The processor 1203 includes but is not limited to one or more of a CPU, an NP, an ASIC, and a PLD. The PLD may be a CPLD, an FPGA, GAL, or any combination thereof.

The memory 1202 may be integrated into the processor 1203. If the memory 1202 and the processor 1203 are components independent of each other, the memory 1202 is connected to the processor 1203. For example, the memory 1202 and the processor 1203 may communicate using a bus. The network interface 1201 and the processor 1203 may communicate using a bus, or the network interface 1201 may be directly connected to the processor 1203.

The processor 1203 is configured to perform the following operations of receiving a first packet from a path computation device in a first network using the network interface 1201, where the first packet includes clock synchronization capability information of a first network element in the first network, and updating the inter-network clock synchronization topology based on the inter-network clock synchronization topology in the memory 1202 and the clock synchronization capability information of the first network element.

The memory 1202 is further configured to store an updated inter-network clock synchronization topology.

Optionally, the first network element is a first edge network device in the first network.

Optionally, the updated inter-network clock synchronization topology further includes a clock injection node of a second network and a second edge network device that has a clock synchronization capability in the first network. The processor 1203 is further configured to determine a clock injection node of the first network based on the updated inter-network clock synchronization topology.

The inter-network path computation device 1200 shown in FIG. 12 and the inter-network path computation device 1100 shown in FIG. 11 may be a same apparatus, for example, an execution entity of the method in FIG. 5. It may be considered that FIG. 12 shows content included in an inter-network path computation device from a physical perspective, and FIG. 11 shows content included in an inter-network path computation device from a logical perspective. Optionally, the receiving unit 1101 shown in FIG. 11 may be implemented by the network interface 1201 shown in FIG. 12, and the updating unit 1102 shown in FIG. 11 may be implemented by the memory 1202 and the processor 1203 shown in FIG. 12.

Figure 13:
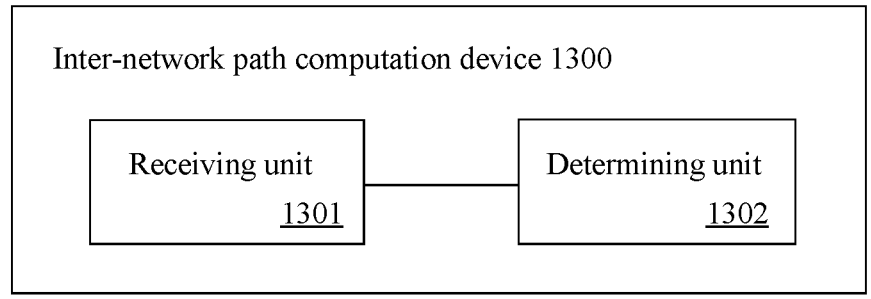
FIG. 13 is a schematic structural diagram of still another inter-network path computation device according to an embodiment of this application.

FIG. 13 is a schematic structural diagram of an inter-network path computation device 1300 according to an embodiment of this application. As shown in FIG. 13, the inter-network path computation device 1300 includes a receiving unit 1301 and a determining unit 1302.

The receiving unit 1301 is configured to receive a first packet from a path computation device in a first network. The first packet is used to request to determine a clock injection node of the first network.

The determining unit 1302 is configured to determine a first edge network device in the first network as a first clock injection node of the first network based on an inter-network clock synchronization topology. The inter-network clock synchronization topology includes the first edge network device and a second clock injection node of a second network, and the second network is an upstream network of the first network.

The determining unit 1302 is further configured to determine a clock synchronization path from the second clock injection node to the first clock injection node.

Optionally, the first packet further includes an identifier of a third clock injection node of the first network, and the third clock injection node and the first clock injection node are different edge network devices.

The inter-network path computation device 1300 provided in this embodiment may be applied to the application scenario shown in FIG. 2, to implement a function of the inter-network path computation device 230. The inter-network path computation device 1300 may be configured to perform the method in the embodiment of FIG. 6, to implement the method in the embodiment of FIG. 6. For another additional function that can be implemented by the inter-network path computation device 1300 and a process of interaction with another device, refer to descriptions of the inter-network path computation device in the method embodiment of FIG. 6. Details are not described herein again.

Figure 14:
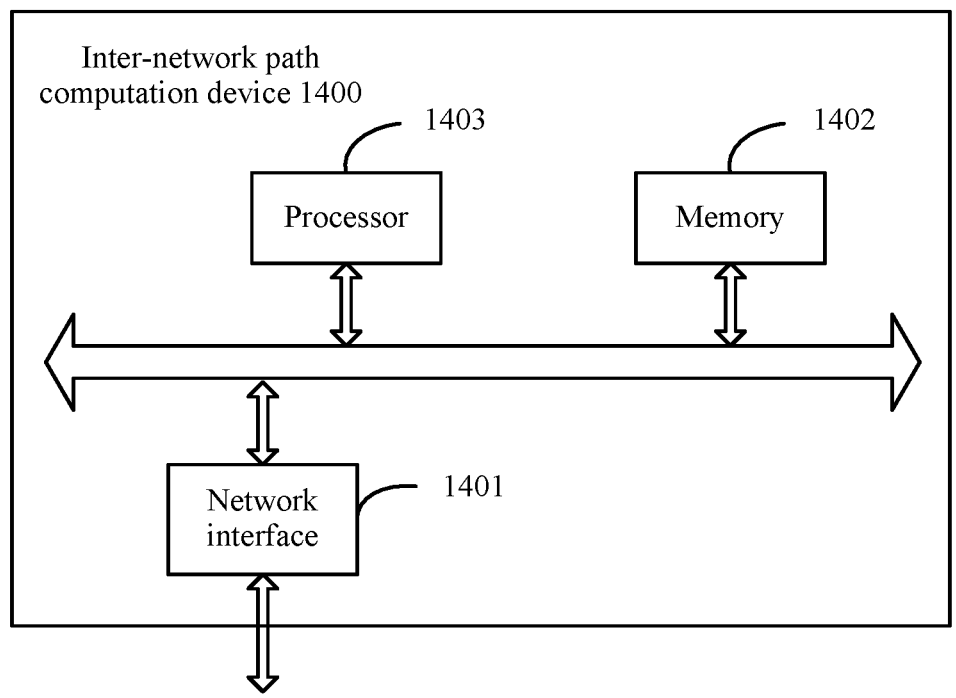
FIG. 14 is a schematic structural diagram of still another inter-network path computation device according to an embodiment of this application.

FIG. 14 is a schematic structural diagram of another inter-network path computation device 1400 according to an embodiment of this application. As shown in FIG. 14, an inter-network path computation device 1400 includes a network interface 1401, a memory 1402, and a processor 1403.

For example, the path computation device 1400 may be a separate server. The inter-network path computation device 1400 may alternatively be a software module or a hardware module of a router, and the network interface, the memory, and the processor are a network interface, a memory, and a processor of the router.

The network interface 1401 may be a wired interface, for example, an FDDI, or an Ethernet interface. The network interface 1401 may alternatively be a wireless interface, for example, a wireless local area network interface.

The memory 1402 is configured to store an inter-network clock synchronization topology. The memory 1402 includes but is not limited to a RAM, a ROM, and an EPROM.

The processor 1403 includes but is not limited to one or more of a CPU, an NP, an ASIC, and a PLD. The PLD may be a CPLD, an FPGA, GAL, or any combination thereof.

The memory 1402 may be integrated into the processor 1403. If the memory 1402 and the processor 1403 are components independent of each other, the memory 1402 is connected to the processor 1403. For example, the memory 1402 and the processor 1403 may communicate using a bus. The network interface 1401 and the processor 1403 may communicate using a bus, or the network interface 1401 may be directly connected to the processor 1403.

The processor 1403 is configured to perform the following operations of receiving a first packet from a path computation device in a first network using the network interface 1401, where the first packet is used to request to determine a clock injection node of the first network, determining a first edge network device in the first network as a first clock injection node of the first network based on the inter-network clock synchronization topology, where the inter-network clock synchronization topology includes the first edge network device and a second clock injection node of a second network, and the second network is an upstream network of the first network, and determining a clock synchronization path from the second clock injection node to the first clock injection node.

Optionally, the first packet further includes an identifier of a third clock injection node of the first network, and the third clock injection node and the first clock injection node are different edge network devices.

The inter-network path computation device 1400 shown in FIG. 14 and the inter-network path computation device 1300 shown in FIG. 13 may be a same apparatus, for example, an execution entity of the method in FIG. 6. It may be considered that FIG. 14 shows content included in an inter-network path computation device from a physical perspective, and FIG. 13 shows content included in an inter-network path computation device from a logical perspective. Optionally, the receiving unit 1301 shown in FIG. 13 may be implemented by the network interface 1401 shown in FIG. 14, and the determining unit 1302 shown in FIG. 13 may be implemented by the processor 1403 shown in FIG. 14.

The embodiments in this specification are all described in a progressive manner. For same or similar parts in the embodiments, refer to these embodiments. Each embodiment focuses on a difference from other embodiments. Especially, a system embodiment is basically similar to a method embodiment, and therefore is described briefly. For related parts, refer to partial descriptions in the method embodiment.

All or some of the steps of the method embodiments may be implemented by a program instructing relevant hardware. The program may be stored in a computer readable storage medium. When the program runs, the steps of the method embodiments are performed. The storage medium includes any medium that can store program code, such as a ROM, a RAM, a magnetic disk, or an optical disc.

Finally, it should be noted that the embodiments are merely intended for describing the technical solutions of the present disclosure, but not for limiting the present disclosure. Although the present disclosure is described in detail with reference to the embodiments, persons of ordinary skill in the art should understand that they may still make modifications to the technical solutions described in the embodiments or make equivalent replacements to some or all technical features thereof, without departing from the scope of the technical solutions of the embodiments of the present disclosure.

What is claimed is:

1. A method for determining a clock synchronization path, comprising:
    receiving a first packet from a first network element, wherein the first packet requests to determine a first clock synchronization path for the first network element, wherein the first packet indicates that a second clock synchronization path from a clock injection node of the first network to the first network element is faulty, wherein the second clock synchronization path comprises at least one network element not on the first clock synchronization path, wherein the first network element is a network element in a first network, and wherein the first network element has a clock synchronization capability;
    determining the first clock synchronization path from the clock injection node to the first network element based on a clock synchronization topology of the first network, wherein the clock synchronization topology of the first network comprises the clock injection node and the first network element; and
    sending first instruction information to the first network element instructing to obtain a clock signal from a previous-hop clock synchronization node of the first network element on the first clock synchronization path.

2. The method of claim 1, further comprising:
    receiving a second packet from the first network element, wherein the second packet comprises clock synchronization capability information of the first network element, wherein the clock synchronization capability information of the first network element comprises information about at least one port in the first network element, and wherein the at least one port has the clock synchronization capability; and
    updating the clock synchronization topology of the first network based on the clock synchronization capability information of the first network element.

3. The method of claim 2, wherein an updated clock synchronization topology of the first network comprises the clock injection node, and wherein the method further comprising determining a third clock synchronization path from the clock injection node to the first network element based on the updated clock synchronization topology of the first network.

4. The method of claim 1, wherein the first packet is a path computation element communication protocol (PCEP) message.

5. A path computation device, comprising:
a non-transitory computer-readable storage medium storing programming instructions; and
a processor coupled to the non-transitory computer-readable storage medium, wherein the programming instructions cause the processor to be configured to:
receive a first packet from a first network element, wherein the first packet requests to determine a first clock synchronization path for the first network element, wherein the first packet indicates that a second clock synchronization path from a clock injection node of the first network to the first network element is faulty, wherein the second clock synchronization path comprises at least one network element not on the first clock synchronization path, wherein the first network element is a network element in a first network, and wherein the first network element has a clock synchronization capability;
determine the first clock synchronization path from the clock injection node to the first network element based on a clock synchronization topology of the first network, wherein the clock synchronization topology of the first network comprises the clock injection node and the first network element; and
send first instruction information to the first network element instructing to obtain a clock signal from a previous-hop clock synchronization node of the first network element on the first clock synchronization path.

6. The device of claim 5, wherein the programming instructions further cause the processor to be configured to:
receive a second packet from the first network element, wherein the second packet comprises clock synchronization capability information of the first network element, wherein the clock synchronization capability information of the first network element comprises information about at least one port in the first network, and wherein the at least one port has the clock synchronization capability; and
update the clock synchronization topology of the first network based on the clock synchronization capability information of the first network element.

7. The device of claim 6, wherein an updated clock synchronization topology of the first network comprises the clock injection node, and wherein the programming instructions further cause the processor to be configured to determine a third clock synchronization path from the clock injection node to the first network element based on the updated clock synchronization topology of the first network.

8. A method for determining a clock synchronization path, comprising:
receiving a first packet from a path computation device in a first network, wherein the first packet requests to determine a first clock injection node of the first network;
determining a first edge network device in the first network as the first clock injection node of the first network based on an inter-network clock synchronization topology, wherein the inter-network clock synchronization topology comprises the first edge network device and a second clock injection node of a second network, and wherein the second network is an upstream network of the first network;
determining the clock synchronization path from the second clock injection node to the first clock injection node; and
sending first instruction information to the path computation device.

9. The method of claim 8, wherein the first packet further comprises an identifier of a third clock injection node of the first network, and wherein the third clock injection node and the first clock injection node are different edge network devices.

10. The method of claim 8, further comprising:
receiving a second packet from the path computation device in the first network, wherein the second packet comprises clock synchronization capability information of a first network element in the first network, and wherein the clock synchronization capability information of the first network element comprises information about at least one port having a clock synchronization capability in the first network element; and
updating the inter-network clock synchronization topology based on the clock synchronization capability information of the first network element.

11. The method of claim 10, wherein the first network element comprises the first edge network device in the first network.

12. The method of claim 10, wherein an updated inter-network clock synchronization topology further comprises a clock injection node of the second network and a second edge network device having a clock synchronization capability in the first network, and wherein the method further comprises determining the clock injection node of the first network based on the updated inter-network clock synchronization topology.

13. The method of claim 8, wherein the first packet is a path computation element communication protocol (PCEP) message.

14. An inter-network path computation device, comprising:
a non-transitory computer-readable storage medium configured to store programming instructions; and
a processor coupled to the non-transitory computer-readable storage medium, wherein the programming instructions cause the processor to be configured to:
receive a first packet from a path computation device in a first network, wherein the first packet requests to determine a first clock injection node of the first network;
determine a first edge network device in the first network as the first clock injection node of the first network based on an inter-network clock synchronization topology, wherein the inter-network clock synchronization topology comprises the first edge network device and a second clock injection node of a second network, and wherein the second network is an upstream network of the first network;
determine a clock synchronization path from the second clock injection node to the first clock injection node; and
send first instruction information to the path computation device.

15. The device of claim 14, wherein the first packet further comprises an identifier of a third clock injection node of the first network, and wherein the third clock injection node and the first clock injection node are different edge network devices.

16. The device of claim 14, wherein the programming instructions further cause the processor to be configured to:
  receive a second packet from the path computation device in the first network, wherein the second packet comprises clock synchronization capability information of a first network element in the first network, and wherein the clock synchronization capability information of the first network element comprises information about at least one port having a clock synchronization capability in the first network element; and
  update the inter-network clock synchronization topology based on the clock synchronization capability information of the first network element.

17. The device of claim 16, wherein the first network element comprises a first edge network device in the first network.

18. The device of claim 16, wherein an updated inter-network clock synchronization topology further comprises a clock injection node of the second network and a second edge network device having a clock synchronization capability in the first network, and wherein the programming instructions further cause the processor to be configured to determine a third clock injection node of the first network based on the updated inter-network clock synchronization topology.

* * * * *